(12) United States Patent
Embree et al.

(10) Patent No.: US 6,198,195 B1
(45) Date of Patent: Mar. 6, 2001

(54) HIGH EFFICIENCY MOTOR FOR LOW VELOCITY, HIGH VOLUME FAN AND OTHER APPLICATIONS

(75) Inventors: Michael E. Embree, Long Beach, MS (US); Alan D. Schinazi; Robert G. Schinazi, both of Providence, RI (US)

(73) Assignee: Oreck Holdings, LLC, Cheyenne, WY (US)

( * ) Notice: Subject to any disclaimer, the term of this patent is extended or adjusted under 35 U.S.C. 154(b) by 0 days.

(21) Appl. No.: 09/417,032

(22) Filed: Oct. 12, 1999

(51) Int. Cl.[7] .............................. H02K 1/22; H02K 1/12; H02K 7/14; H02K 5/24
(52) U.S. Cl. ........................... 310/261; 310/254; 310/47; 310/50; 310/51
(58) Field of Search ..................................... 310/261, 264, 310/265, 267, 268, 269, 254, 258, 259, 40 MM, 46, 47, 50, 51, DIG. 2

(56) References Cited

U.S. PATENT DOCUMENTS

| | | | | |
|---|---|---|---|---|
| 3,978,354 | * | 8/1976 | Lee et al. | 310/60 R |
| 4,508,988 | * | 4/1985 | Reiss et al. | 310/154 |
| 5,034,641 | * | 7/1991 | Komuro et al. | 310/154 |
| 5,243,248 | * | 9/1993 | Benford et al. | 310/256 |
| 5,684,352 | * | 11/1997 | Mita et al. | 310/156 |
| 5,856,715 | * | 1/1999 | Peot et al. | 310/50 |

* cited by examiner

Primary Examiner—Elvin Enad
Assistant Examiner—Dang Dinh Le
(74) Attorney, Agent, or Firm—Dorsey & Whitney LLP

(57) ABSTRACT

A high efficiency motor for low velocity and high volume fans and other applications includes an armature, a stator and a motor shaft. The armature is made from plates that collectively have a stack height that give the armature a thickness. The plates are keyed with a keyway and the motor shaft has a key to increase alignment accuracy and armature assembly efficiency. An armature aspect ratio is determined by the armature diameter divided by the armature thickness. Similarly a stator aspect ratio is determined by a stator diameter divided by a stator thickness. The armature and the stator aspect ratios are selected to increase torque output and lower rotational speed of the motor for various power output levels. Magnetic permeability properties of the armature and stator is selected to increase operating efficiency of the motor and decrease motor size. When incorporated into devices such as vacuum cleaners, carpet extractors, floor buffers, and yard blowers, the motor decreases unwanted noise and increases operating efficiency.

5 Claims, 13 Drawing Sheets

HIGH EFFICIENCY MOTOR FOR LOW VELOCITY, HIGH VOLUME FAN AND OTHER APPLICATIONS

TECHNICAL FIELD

The present invention relates to electric motors and more particularly, to high efficiency electric motors for compact, low speed, high volume blowers, fans and other applications for use in devices such as vacuum cleaners and air cleaners.

BACKGROUND OF THE INVENTION

Conventional vacuum cleaning systems, including conventional upright vacuum cleaners are commonly used in both residential and commercial settings to remove dust, debris and other particulates from floor surfaces, such as carpeting, wood flooring, and linoleum. A typical conventional upright vacuum cleaner includes a wheel-mounted head which includes an intake nozzle positioned close to the floor, a handle that extends upwardly from the head so the user can move the vacuum cleaner along the floor while remaining in a standing or walking position, and a blower or fan. The fan takes in a flow of air and debris through the intake nozzle and directs the flow into a filter bag or receptacle which traps the debris while allowing the air to pass out of the vacuum cleaner. The fan is generally propelled by an electric motor.

Typical upright vacuum cleaners use electric motors that operate at very high revolutions per minute (rpm) such as 25,000 rpm. Although these vacuum cleaners are functional, the high rpm motors impart undesirable qualities to the cleaners. By operating at such high rpm, the motors cause unwanted vibration and noise which greatly detracts from the vacuum cleaning experience. Since gear systems between motors and fans are not customary in vacuum cleaners due to their added weight and size, the fans in these cleaners also spin at high rpm which further contributes to the excessive noise and vibration. As a result these vacuum cleaners hinder normal conversation between humans during operation which raises issues regarding safety among other things. The excessive noise and vibration also can tend to contribute to greater fatigue of the vacuum cleaner operator.

An optimal low rpm motor for applications such as vacuum cleaners, yard blowers, floor buffers, and extractors for carpets and floors, must also be compact, light weight, produce little heat, and have high torque output as well as operate at a low rpm. Prior attempts at designing such motors have experienced many problems in arriving at an effective combination of these attributes. For instance, relatively cooler running motors have typically been heavy having extra thermal mass. Other high torque motors have been too bulky for effective use in these devices. Given this lack an effective combination of attributes, the typical prior art motors in such devices as vacuum cleaners, air cleaners, yard blowers, floor buffers, and extractors for carpets and floors have remained low torque, high rpm despite the inherent noise and vibration problems involved.

SUMMARY OF THE INVENTION

The present invention relates to systems that incorporate an electric motor. The electric motor includes a motor shaft, a commutator attached to the motor shaft, an armature and a stator. The armature has an armature diameter, an armature thickness, an armature aspect ratio, and armature windings. The armature aspect ratio is equal to the armature diameter divided by the armature thickness. The armature winding are electrically coupled to the commutator. Some aspects of the invention include the armature aspect ratio being no less than three and a portion of the armature having a magnetic permeability such that when the armature portion is saturated by a magnetic field, the armature portion is saturated at or above 1.8 Tesla. The stator has a stator outer diameter, a stator thickness, a stator aspect ratio, and stator windings. The stator aspect ratio is equal to the stator outer diameter divided by the stator thickness. In some aspects of the invention, the stator aspect ratio is no less than five and a portion of the stator has a magnetic permeability such that when the stator portion is saturated by a magnetic field, the stator portion is saturated at or above 1.8 Tesla.

Some aspects of the invention include a rotatable device coupled to an end portion of the motor shaft. In other aspects of the invention, the rotatable device comprises one of a plurality of various devices including a fan of a vacuum system, a fan of a blower system, frictional material, and a fan of an air cleaner system.

DETAILED DESCRIPTION OF THE INVENTION

The present invention is directed toward high efficiency electric motors for compact, low speed, high volume blowers, fans, and other applications for use in devices such as vacuum cleaners. The motor includes components such as a commutator, stator, armature, and windings to allow compact, low weight, low temperature, high torque, and low rpm operation. Many specific details of certain embodiments of the invention are set forth in the following description and in FIGS. 1–13 to provide a thorough understanding of such embodiments. One skilled in the art, however, will understand that the present invention may have additional embodiments and that they may be practiced without several of the details described in the following description.

Figure 1:
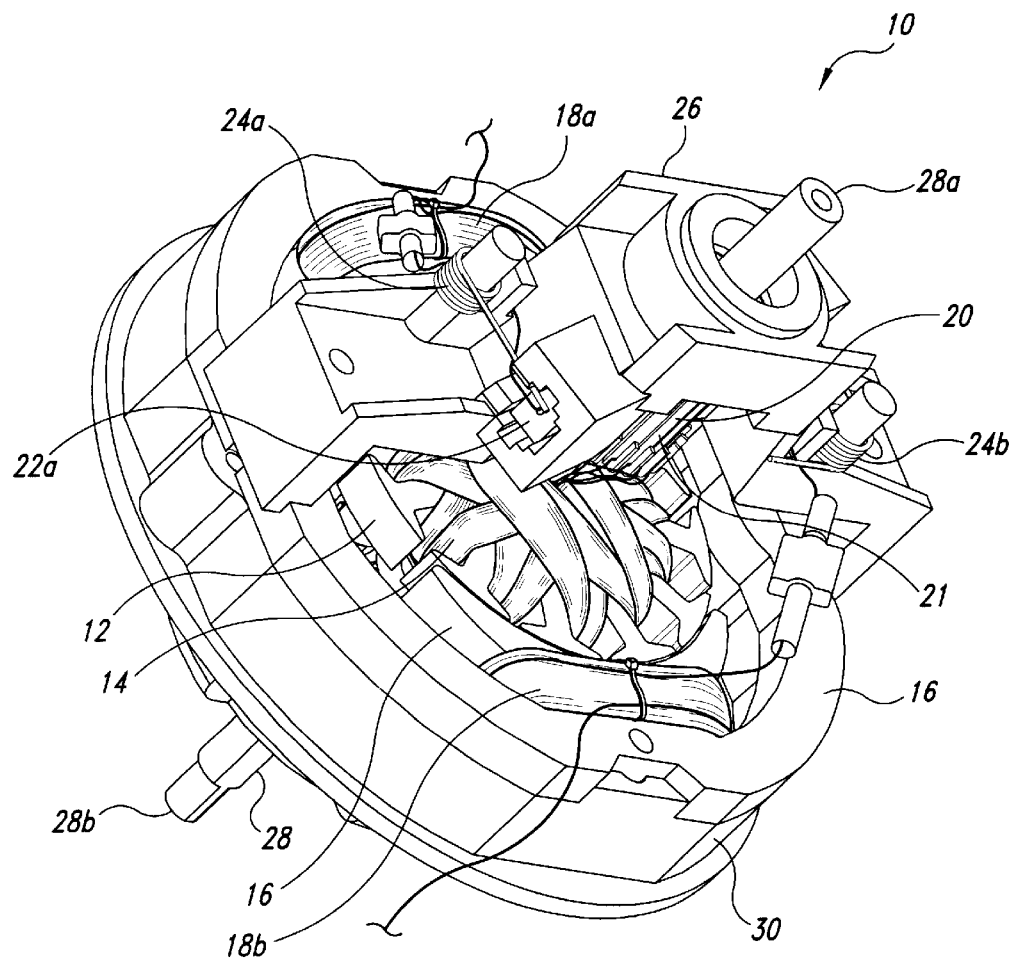
FIG. 1 is a rear isometric view of an electric motor in accordance with an embodiment of the invention.
Figure 2:
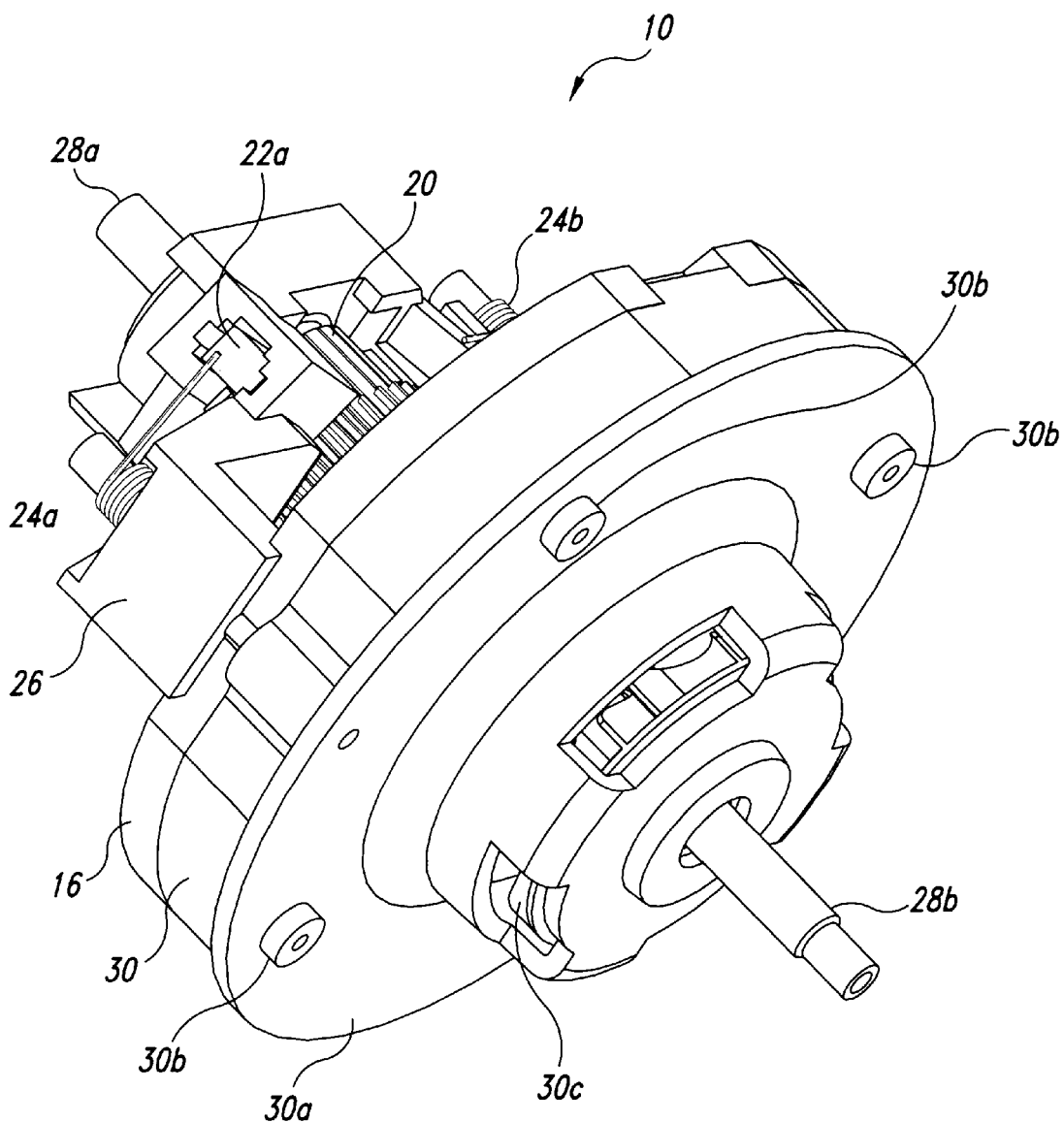
FIG. 2 is a front isometric view of the electric motor shown in FIG. 1.

FIGS. 1 and 2 are isometric views of an electric motor 10 in accordance with an embodiment of the invention including an armature 12 and associated armature windings 14 and a stator 16 and associated stator windings 18a,b. The electric motor 10 is in the general class of commutator or universal motors having a commutator 20 with contacts 21 that electrically contact brushes 22a and 22b (see FIG. 3) as held in position by springs 24a,b and a brush mount 26. The armature windings 14 are energized through electrical coupling through the commutator 20 to a power source (not shown). The power source in some embodiments supplies 120 volt, 60 Hertz, electrical power to the motor 10. In other embodiments, the power source is direct current provided by batteries since efficiencies of the motor 10 allow for battery applications. Further embodiments utilize electrical power of other voltages and frequencies or from other direct current sources.

Figure 3:
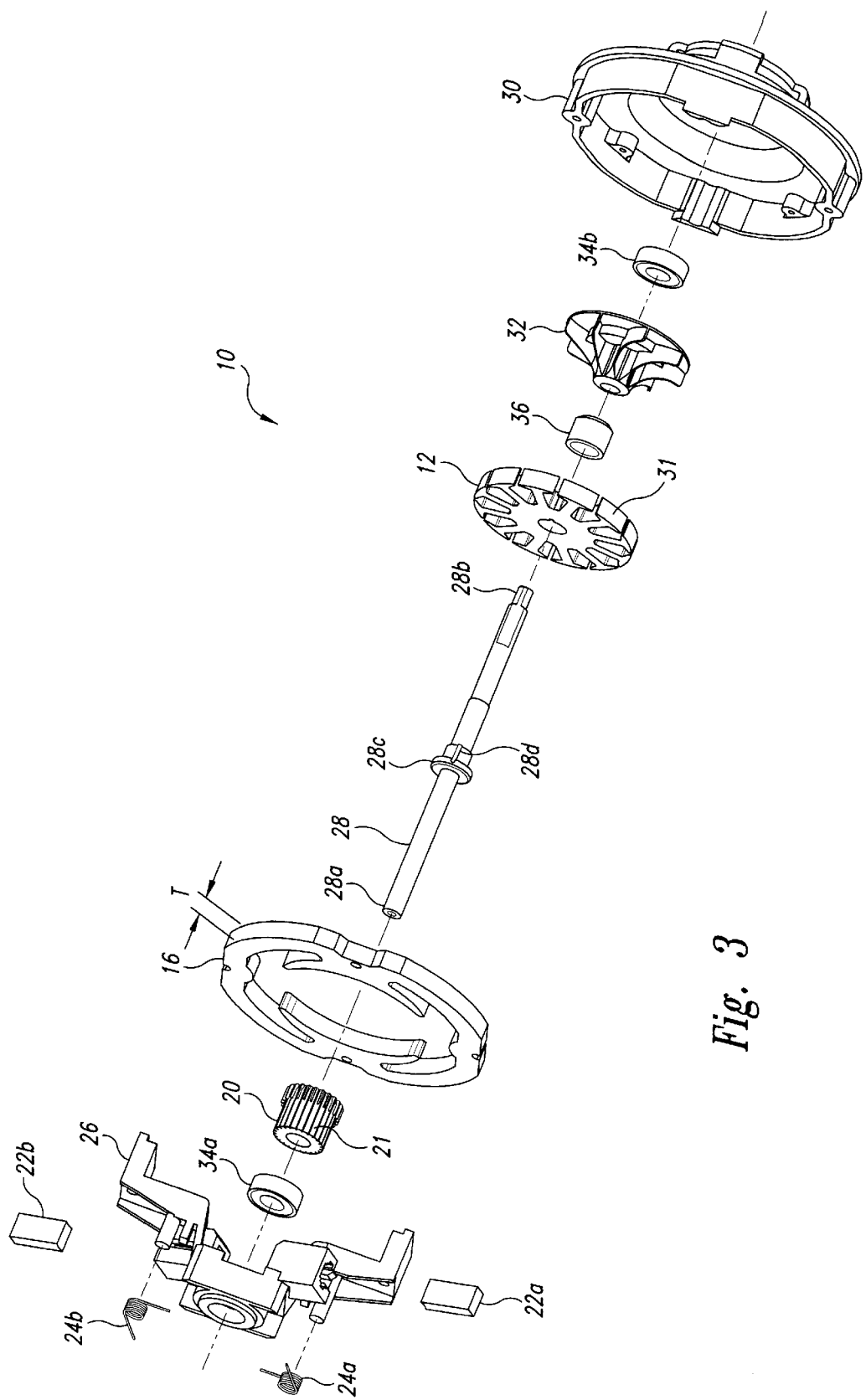
FIG. 3 is an exploded isometric view of the electric motor shown in FIG. 2 without electrical wiring aspects shown.
Figure 4:
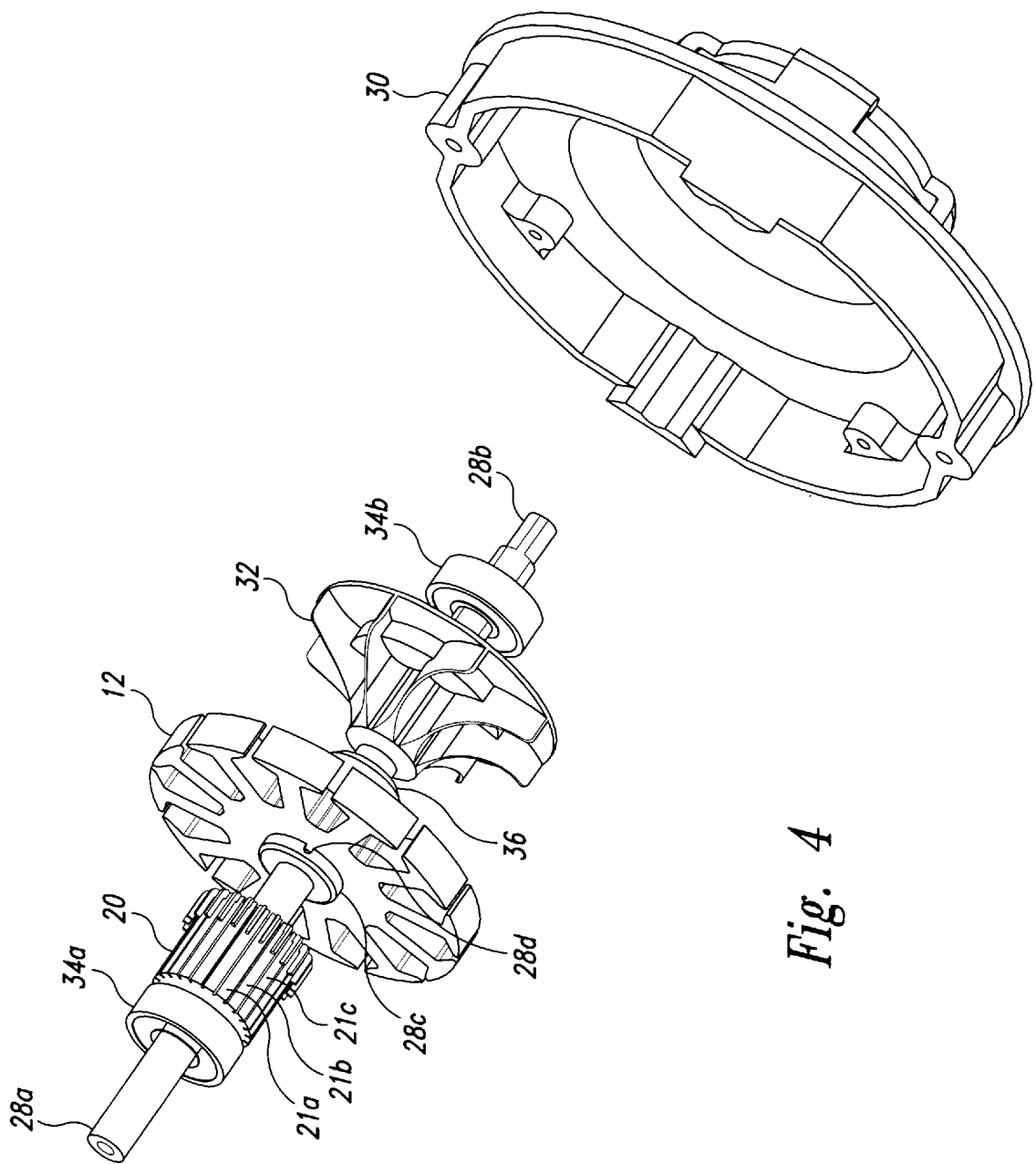
FIG. 4 is an isometric view of the motor shaft assembly of the electric motor shown in FIG. 3.

The motor 10 further includes a motor shaft 28 with end portions 28a,b and a front plate 30. As shown in FIG. 2, in one embodiment, the front plate 30 has a flange 30a and mounting screw holes 30b for mounting the motor 10 in a vacuum cleaner as discussed below. The front plate 30 also has exhaust ports 30c which allow hot exhaust air to vent from the motor 10 to reduce motor operating temperature. FIG. 3 shows an exploded isometric view of the motor 10 without the armature windings 14 and the stator windings 18. The armature further includes twelve poles 31 as shown for the embodiment depicted in FIG. 3. Other embodiments have different numbers of poles. The commutator 20 further includes contacts 21 that momentarily physically contact the brushes 22a,b as the motor shaft 28 rotates during operation of the motor 10. In some embodiments for the twelve-pole armature, the commutator 20 has 24 contacts to reduce electrical arcing compared with, for instance, a commutator with 12 contacts. The motor shaft 28 further includes a shaft flange 28c and a key 28d which assist in assembly of the armature 12. Some embodiments include a motor fan 32 that fits inside the front plate 30 to help keep operation of the motor 10 below a maximum desired temperature. Bearings 34a,b rotatably secure the components of the motor 10 within the brush mount 26 and front plate 30. A retaining nut 36 further secures the armature 12 against the shaft flange 28c as shown in FIG. 4.

Figure 5:
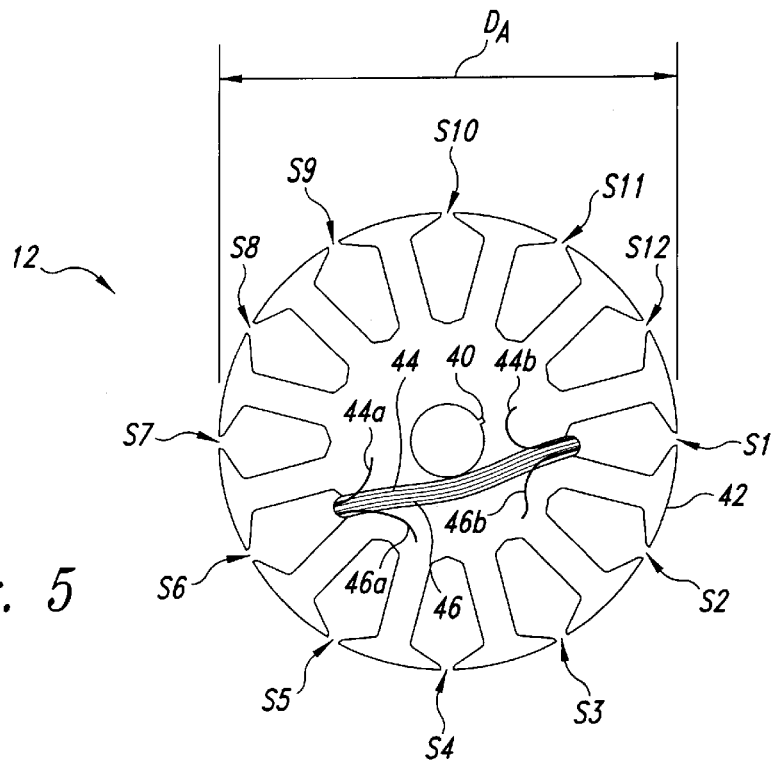
FIG. 5 is a front view of the armature of the motor shaft assembly of the electric motor shown in FIG. 4.

In the embodiment shown in FIG. 5, the armature 12 has a keyway 40 to match the key 28d for assembly of the armature. The armature 12 also has twelve poles 31, twelve slots S1–S12 and a diameter, $D_A$, ranging from 0.5 to 7.0 inches. In one embodiment, the armature 12 has a diameter, $D_A$, of 2.73 inches. The armature windings 14, in some embodiments, have the same number of coils of wire as the number of contacts 21 for the commutator 20. For instance, for the commutator 20 of FIGS. 3 and 4 and the armature 12 of FIG. 5, there is a total of 24 coils of wire for the armature windings 14. As shown in FIG. 5, two of the coils of wire 44 with ends 44a,b and 46 with ends 46a,b are wound between slots S1 and S6 of the armature 12. In one embodiment each coil of the armature windings 14 has approximately 45 turns with 26 gauge copper wire and the stator windings 18 use 23 gauge copper wire. End 44a of the coil 44 is connected to a first contact 21a of the commutator 20 that is approximately 60 degrees out of alignment with slot S1 for timing purposes. End 44b of the coil 44 is connected to a second contact 21b of the commutator 20 adjacent the first contact of the commutator. End 46a of the coil of wire 46 is also connected to the second contact 21b of the commutator and end 46b of the coil 46 is connected to a third contact 21c of the commutator 20 adjacent the second contact. Table 1 summarizes how each coil of wire of the associated windings 14 of the armature 12 is wound and how they are connected to the commutator 20.

| Coil | 1st contact | 1st slot | 2nd Slot | 2nd Contact |
|---|---|---|---|---|
| 1 | 1 | 1 | 6 | 2 |
| 2 | 2 | 1 | 6 | 3 |
| 3 | 3 | 2 | 7 | 4 |
| 4 | 4 | 2 | 7 | 5 |
| 5 | 5 | 3 | 8 | 6 |
| 6 | 6 | 3 | 8 | 7 |
| 7 | 7 | 4 | 9 | 8 |
| 8 | 8 | 4 | 9 | 9 |
| 9 | 9 | 5 | 10 | 10 |
| 10 | 10 | 5 | 10 | 11 |
| 11 | 11 | 6 | 11 | 12 |
| 12 | 12 | 6 | 11 | 13 |
| 13 | 13 | 7 | 12 | 14 |
| 14 | 14 | 7 | 12 | 15 |
| 15 | 15 | 8 | 1 | 16 |
| 16 | 16 | 8 | 1 | 17 |
| 17 | 17 | 9 | 2 | 18 |
| 18 | 18 | 9 | 2 | 19 |
| 19 | 19 | 10 | 3 | 20 |
| 20 | 20 | 10 | 3 | 21 |
| 21 | 21 | 11 | 4 | 22 |
| 22 | 22 | 11 | 4 | 23 |
| 23 | 23 | 12 | 5 | 24 |
| 24 | 24 | 12 | 5 | 1 |

Figure 6:
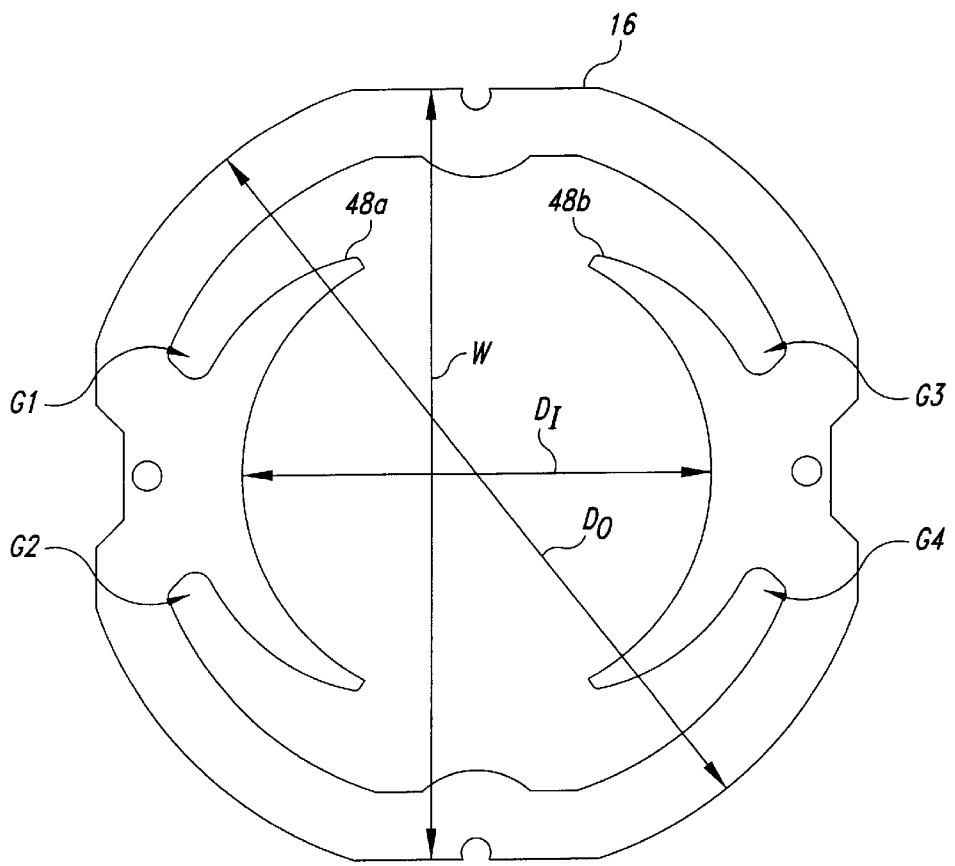
FIG. 6 is a front view of the stator of the electric motor shown in FIG. 3.

In one embodiment, when the diameter, $D_A$, of the armature is 2.73 inches, the inner diameter, $D_I$, of the stator is 2.79 inches, as shown in FIG. 6. For this embodiment, the width, W, of the stator is 4.50 inches and the outer diameter, $D_O$, of the stator is 4.75 inches. The stator includes an extension 48a that provides gaps G1 and G2 and an extension 48b that provides gaps G3 and G4. The stator winding 18a is a single coil of wire wound between gaps G1 and G2. The stator winding 18b is a single coil of wire wound between gaps G3 and G4.

Figure 7A:
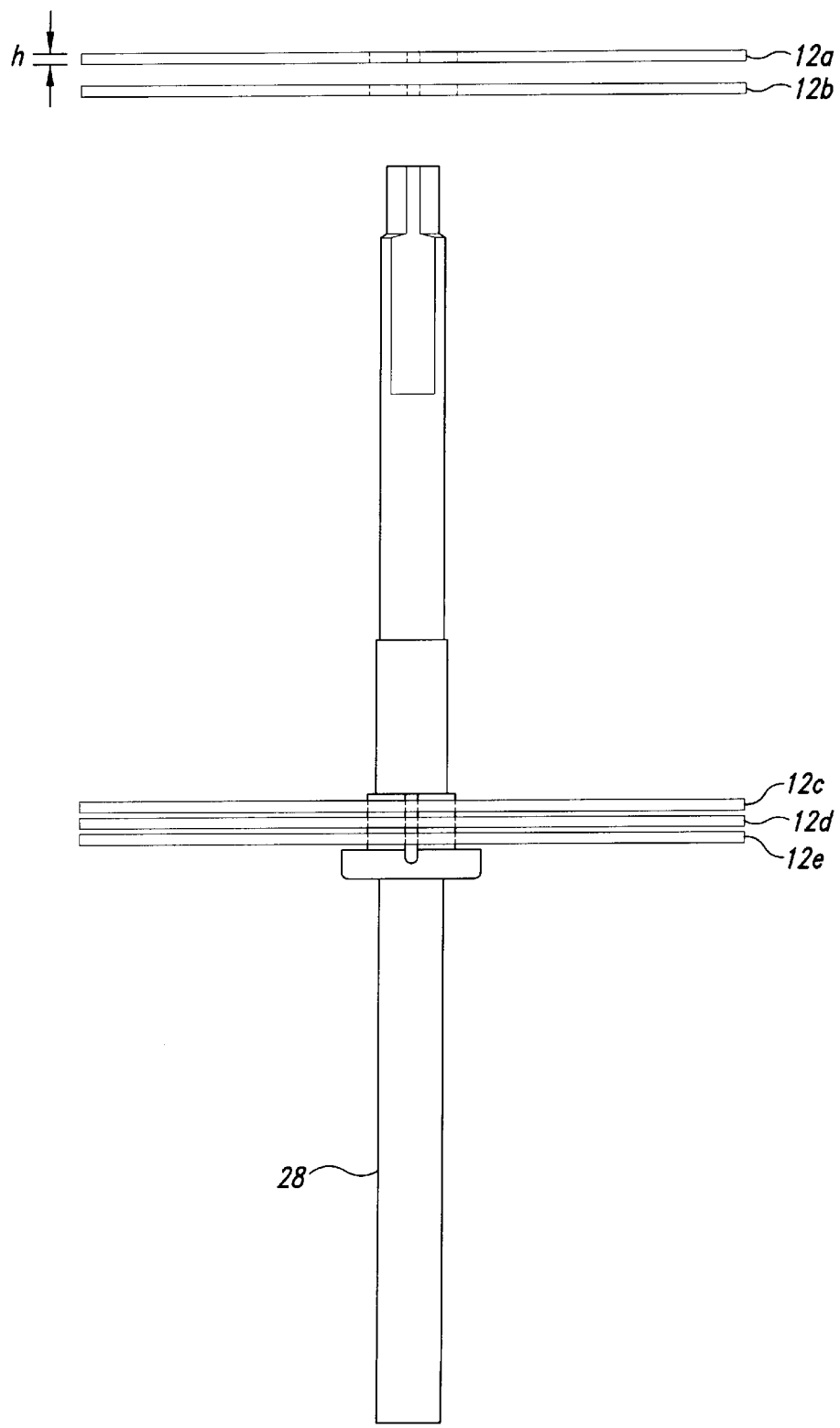
FIGS. 7A and 7B are top views of the motor shaft and armature of the motor shaft assembly of the electric motor shown in FIG. 4.
Figure 7B:
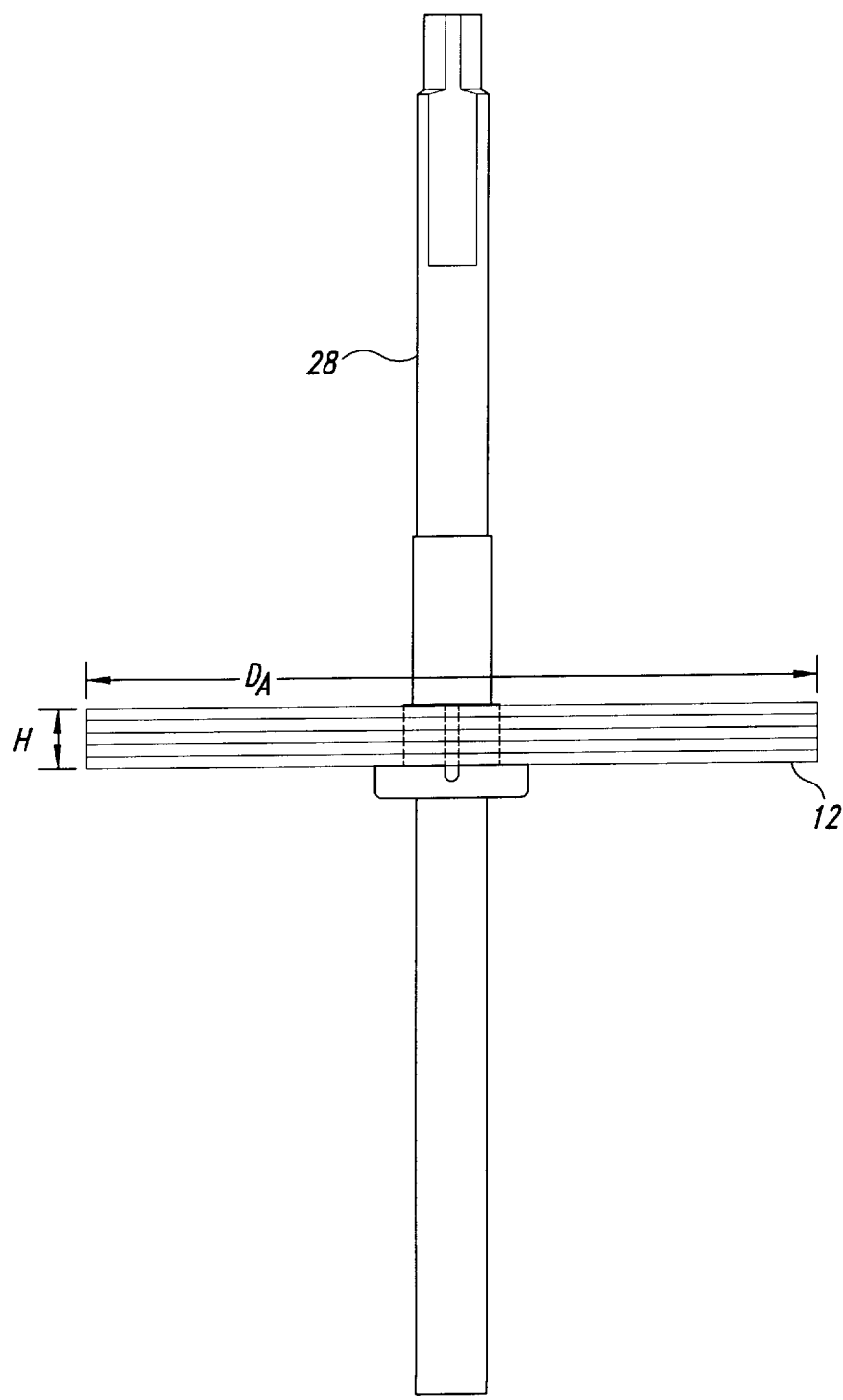

Both the armature 12 and the stator 16 are made of a series of plates that are stacked on top of one another. FIG. 7 illustrates how plates 12a–e are slid on to the motor shaft 28 to form the armature 12. Each plate has a keyway 40 that slips over the key 28d of the motor shaft 28, for alignment of the plates. The plates are then secured against the shaft flange 28c with the retaining nut 36.

The number of plates used depend upon their thickness and the total stack height, 11, desired. For instance, in one embodiment, the armature plates each have a thickness of 0.019 inches and the total number of plates used for the armature 12 result in a stack height, H, of 0.375 inches which is the armature thickness. The stator 16, for the same embodiment, uses plates having a thickness of 0.025 inches and the total number of plates used for the stator result in a thickness, T, of the stator of 0.375 inches. Stacking the plates together for the armature and stator helps to reduce unwanted heat due to magnetic eddy currents and thereby increases motor efficiency.

In some embodiments, the armature and stator plates are made from low carbon steel such as M19 classification. In another embodiment, iron ferrite is used for the plates since it is permeable to magnetic flux but is non-conductive to electricity. One drawback to the iron ferrite material, however, is its relatively brittle nature since it is of ceramic composition. Still other embodiments use plates having a high cobalt content. Portions of various materials of these embodiments have a magnetic permeability such that when the portions are saturated by a magnetic field, the portions are saturated at or above 1.8 Tesla. A higher permeability allows for a larger magnetic flux density in a material so that a stronger electromagnetic field can be applied to the armature 12 and the stator 16 before an oversaturation condition is reached. If oversaturation is reached, additional unwanted heat is generated. Thus, by using higher permeability materials, the motor 10 is smaller, runs cooler, and is more powerful than comparable prior art motors that use lower permeability materials.

The armature 12 has a diameter, $D_A$, that is significantly larger than armatures of prior art motors of comparable power output. With a large diameter, $D_A$, the armature 12 also has a large associated moment arm which allows for increased torque and lower rpm of the motor 10 compared with prior art motors of comparable power output. The large armature diameter, $D_A$, combined with the shape of each pole 42 of the armature 12 result in substantially greater cross-sectional area for each slot, S1–S12, of the armature than prior art armatures for motors of similar power output. The greater cross-sectional area of the slots, S1–S12, of the armature 12 allows for the use of significantly lower gauge wire for the armature windings 14. The lower gauge wire has a larger diameter and more cross-sectional area which allows for lower current densities for a given amount of current. Lower current density helps to reduce heating loads, so that the motor 10 is able to run cooler than motors that use thinner armature wire of higher gauges. In one embodiment, the motor 10, using an armature diameter $D_A$, of approximately 2.9 inches, has current densities in the armature windings 14 of approximately no greater than 13.8 amps/mm$^2$ with a 120 volt, 60 Hz power source. Other embodiments of the motor 10 use smaller current densities in the armature windings as low as 10 amps/mm$^2$.

For a given diameter, $D_A$, of the armature 12, the thickness of the armature and the thickness of the stator 16 directly influence the power output of the motor 10. Greater thickness of the armature 12 and the stator 16 will favor increased power output from the motor 10 for a given material used for the armature and the stator. This is because the amount of iron in the armature 12 and the stator 16 directly affects the strength of electromagnetic fields produced from the armature windings 14 and the stator windings 18. Increases in field strength favor increases in power output of the motor 10. Motors using the same amount of material having the same magnetic permeability for the armature 12 and the same amount of material having the same magnetic permeability for the stator 16 will generally have comparable power output assuming other factors are also comparable between the motors.

As explained above, increases in the diameter of the armature 12 and the stator 16 are favorable to increases in the amount of torque that the motor 10 produces. Power output is proportional to the torque produced by the motor 10 multiplied by the rate of rotation of the motor in rpm. Consequently, for a given amount of power output, as torque of the motor increases, the rotational speed of the motor will decrease. Thus, the motor 10 of the present invention having a large armature diameter, $D_A$, will have higher torque and lower rotational rate compared to prior art motors of comparable power output.

Prior art small frame motors used, for instance, in vacuum cleaners have armature diameters typically of about an inch whereas one embodiment of the invention has an armature diameter, $D_A$, of 2.73 inches or almost three times as large as the prior art armature diameters. Consequently, the motor 10 of the embodiment produces approximately 0.9 horsepower output and approximately 50 ounce-inches of torque (approximately 671 Watts output and approximately 3,640 gram-centimeters of torque). This amount of torque is about three times as much as that produced by prior art motors of comparable power output. Also the rotational rate of the motor 10 found in the embodiment is approximately 7200 rpm which is about one third the rotational rates of prior art motors of comparable power output. Since the armature diameters of these prior art motors are about one third of the armature diameter, $D_A$, of the motor 10 of the embodiment, the stack height for an armature of a prior art motor is approximately seven times greater than the stack height, H, of the armature 12 of the embodiment of the motor 10. Thus, the embodiment of the motor 10 is relatively compact.

The stator aspect ratio and the armature aspect ratio are two ways of characterizing the structure the motor 10 in relation to its power output, torque, rotational rate, and amounts of material used. The stator aspect ratio is equal to the outer diameter, $D_O$, of the stator divided by the thickness, T, of the stator. Similarly, the armature aspect ratio is equal to the armature diameter, $D_A$, divided by the stack height, H, of the armature. For the embodiment described above, the armature aspect ratio is approximately 7.3 whereas a typical armature aspect ratio for a prior art motor of comparable power output is about 0.5. Similarly, the stator aspect ratio for the embodiment described above is approximately 12.7 whereas a typical stator aspect ratio for a prior art motor of comparable power output is about 0.8. Other embodiments have similar aspect ratios that are far different than prior art motors of comparable power output. For power output in the range of 0.25 horsepower to 2.0 horsepower and greater, other embodiments have armature aspect ratios of 3 or greater and have stator aspect ratios of 5 or greater.

Figure 8:
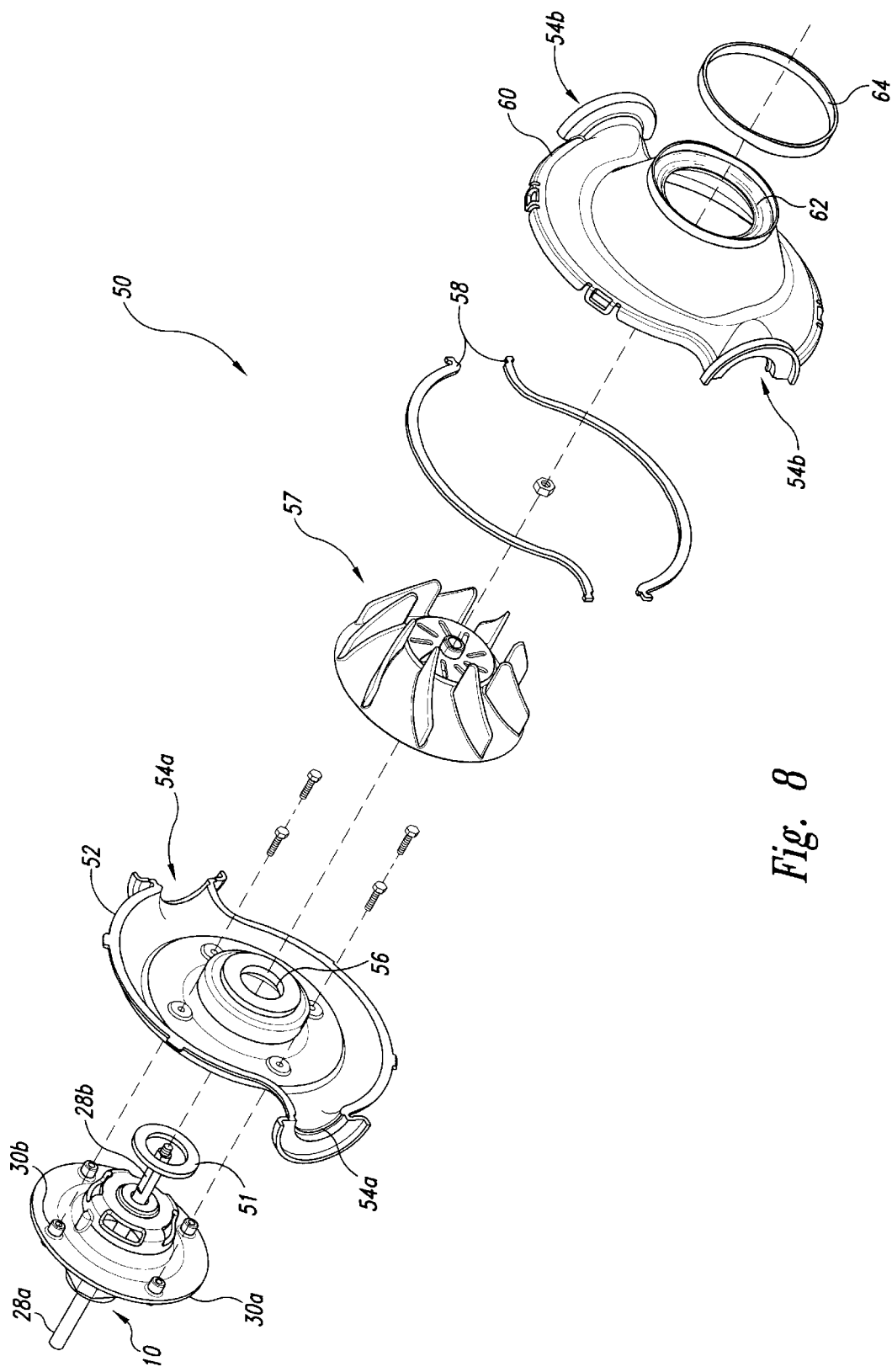
FIG. 8 is an exploded view of an air flow propulsion device in which an embodiment of the electric motor shown in FIG. 1 is used.

The motor 10 is used in one embodiment for an air flow propulsion device 50, as shown in FIG. 8. The air flow propulsion device 50 incorporates the motor 10 affixed along with a motor gasket 51 to a rear housing 52 having exit apertures 54 and a shaft aperture 56. The air flow propulsion device 50 uses the motor 10 to rotate a fan 57 separated by housing gaskets 58 from a forward housing 60 having an entrance aperture 62 and a gasket 64. The fan propels air from the entrance aperture 62 to the exit apertures 54.

Figure 9:
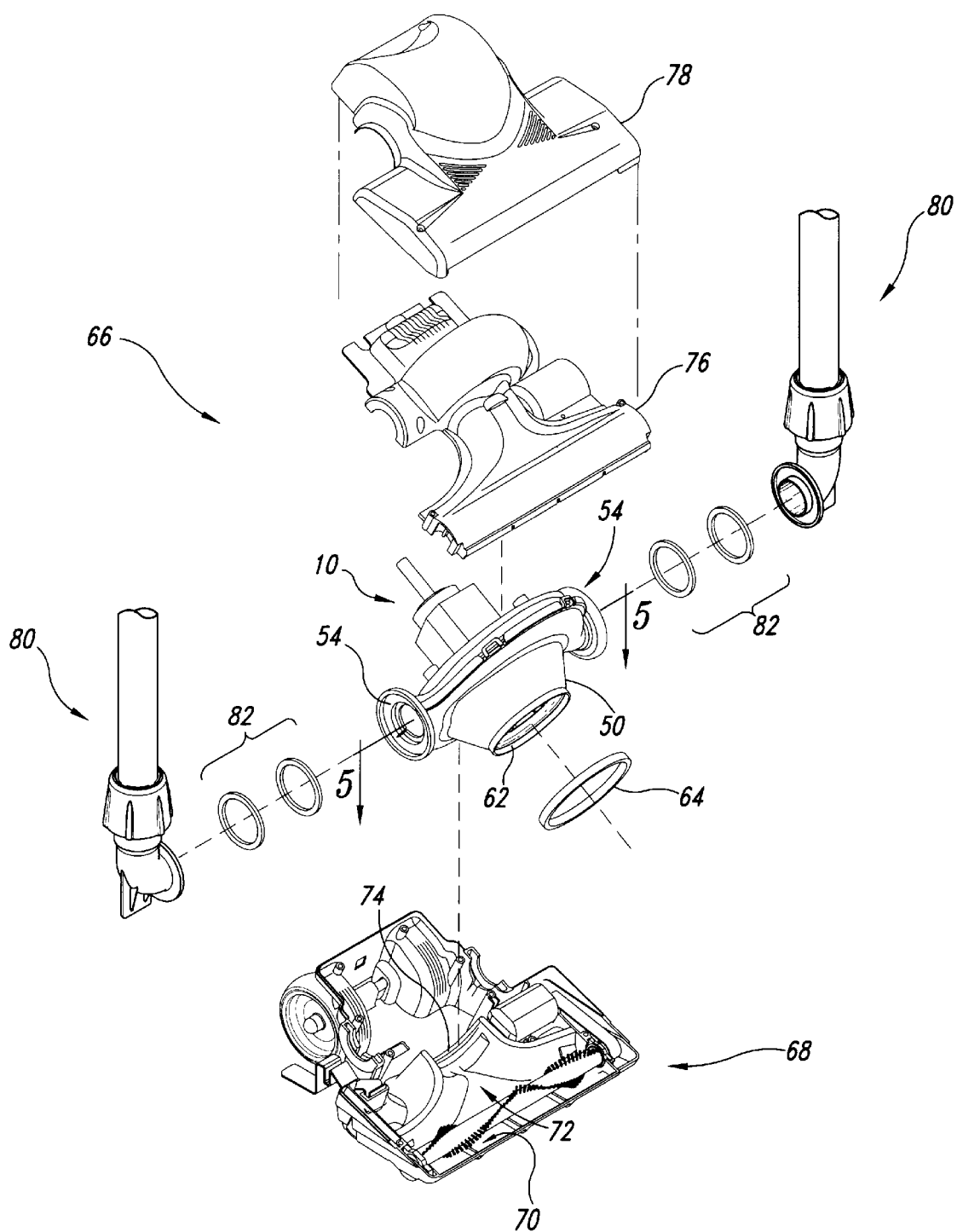
FIG. 9 is an exploded isometric view of a lower portion of a vacuum cleaner which uses the air flow propulsion device of FIG. 8.
Figure 10:
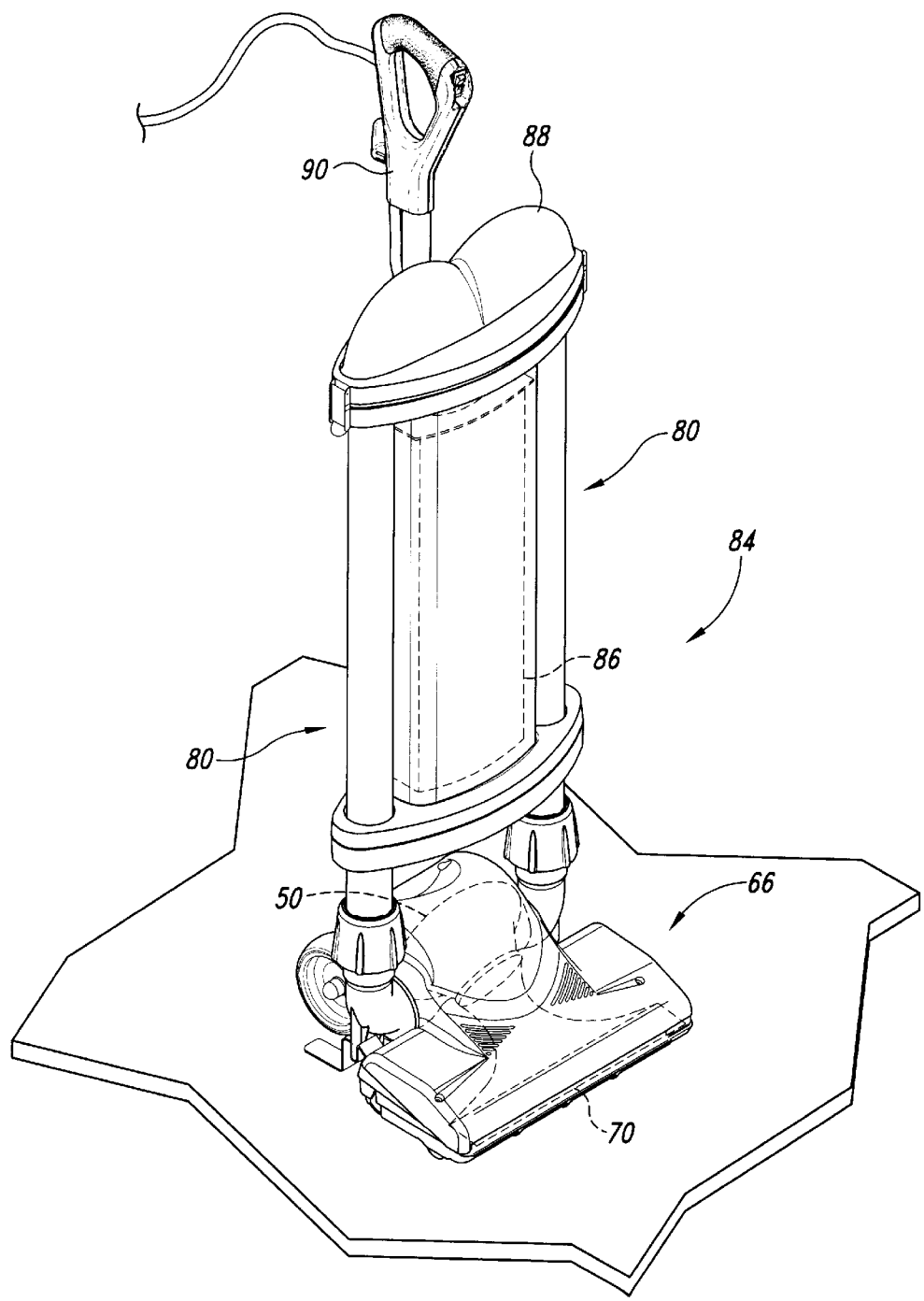
FIG. 10 is a front isometric view of the vacuum cleaner whose lower portion is shown in FIG. 9.
Figure 11:
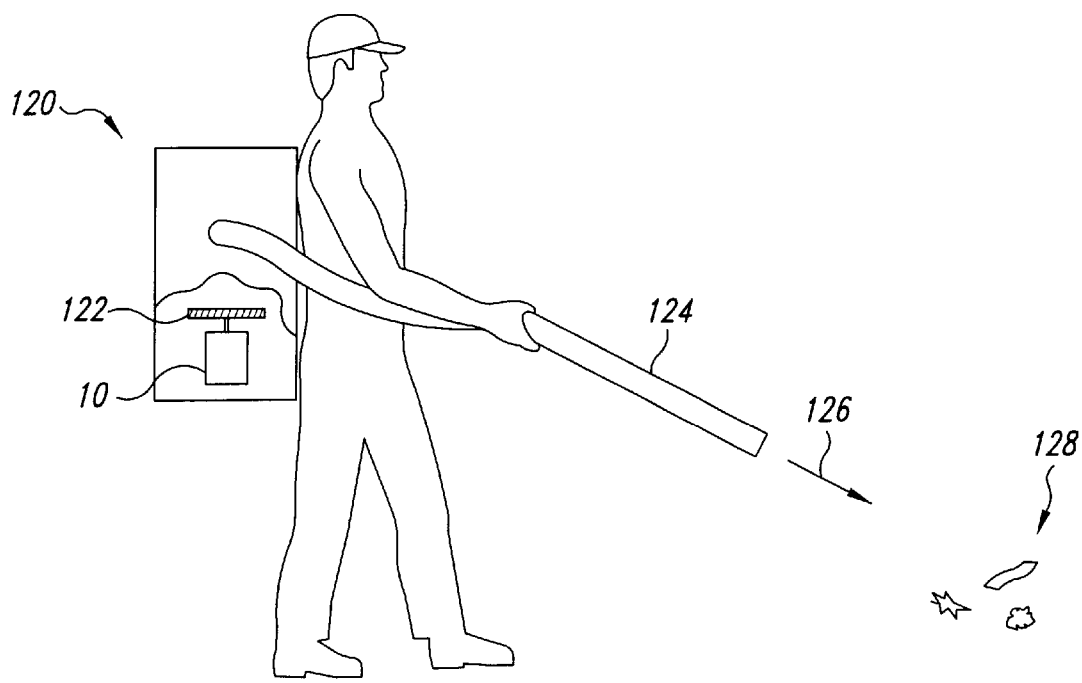
FIG. 11 is a schematic representation illustrating the electric motor in accordance with a yard blower embodiment of the present invention.

As shown in FIG. 9, the air flow propulsion device 50 is further incorporated into an intake body 66 having a baseplate 68 with an intake aperture 70, a flow channel 72, and a channel exit 74. The airflow propulsion device 50 is housed by a baseplate 68, an inner cover 76, and an outer cover 78. Additional components of the intake body 66 include conduits 80 and seals 82. The intake body 66 is incorporated, as shown in FIG. 10, into a vacuum cleaner 84 having a filter element 86, a manifold 88, and an upwardly extending handle 90.

Figure 12:
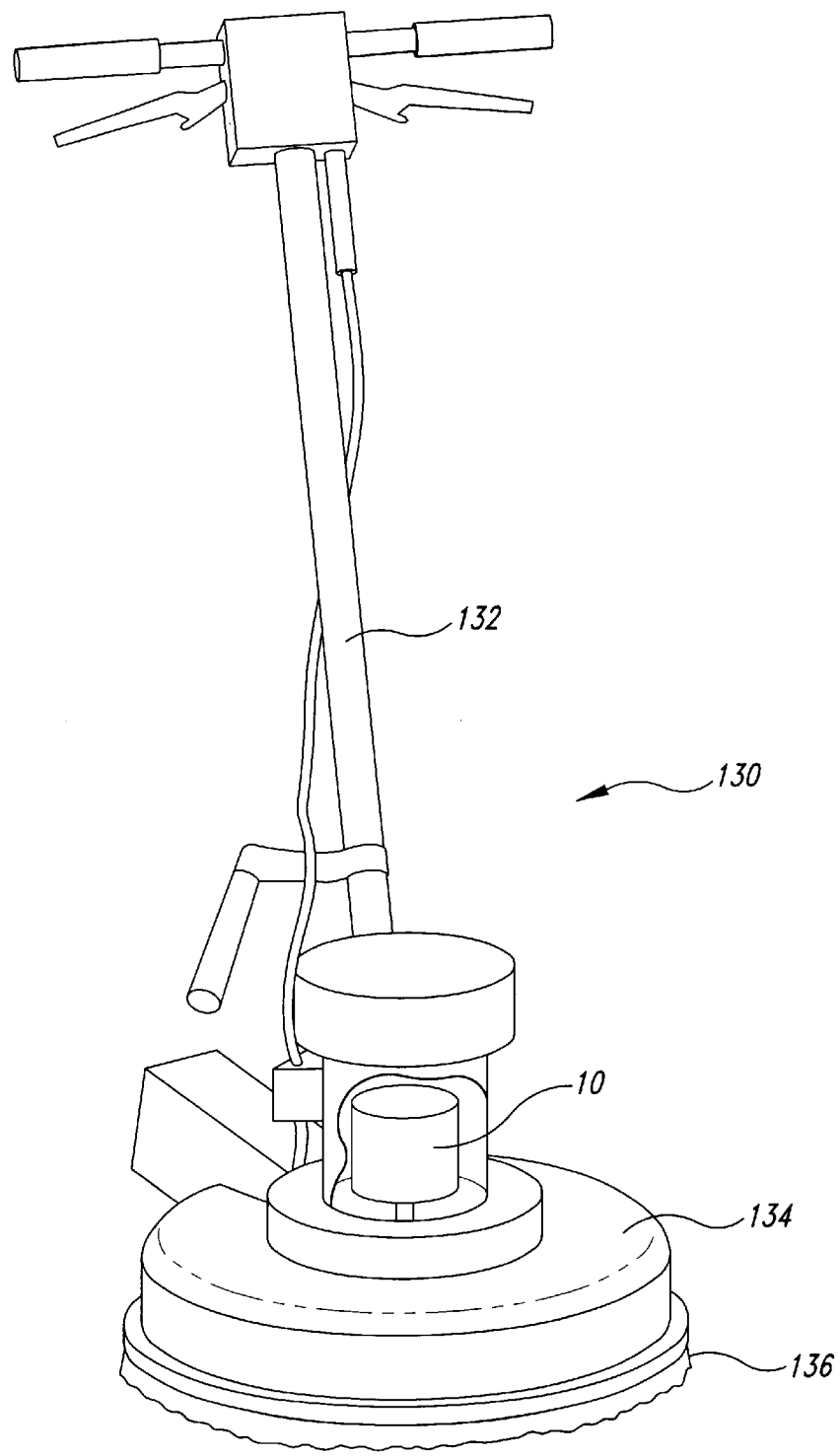
FIG. 12 is a front isometric illustrating the electric motor in accordance with a floor buffer embodiment of the present invention.

In another embodiment, the motor 10 is incorporated into an electric powered yard blower 120, as shown in FIG. 12, that is used to directionally blow yard debris for landscape maintenance. The yard blower 120 includes the motor 10, a blower fan 122, and an air flow director 124 to direct an air stream 126 toward yard debris 128. One embodiment of the motor 10, as incorporated in the yard blower 120, has an armature diameter, $D_A$, of 2.7 inches and an armature aspect ratio of 7. Other embodiments of the motor 10 incorporated into the yard blower 120 have armature aspect ratios of 3 or greater and stator aspect ratios of 5 or greater.

Figure 13:
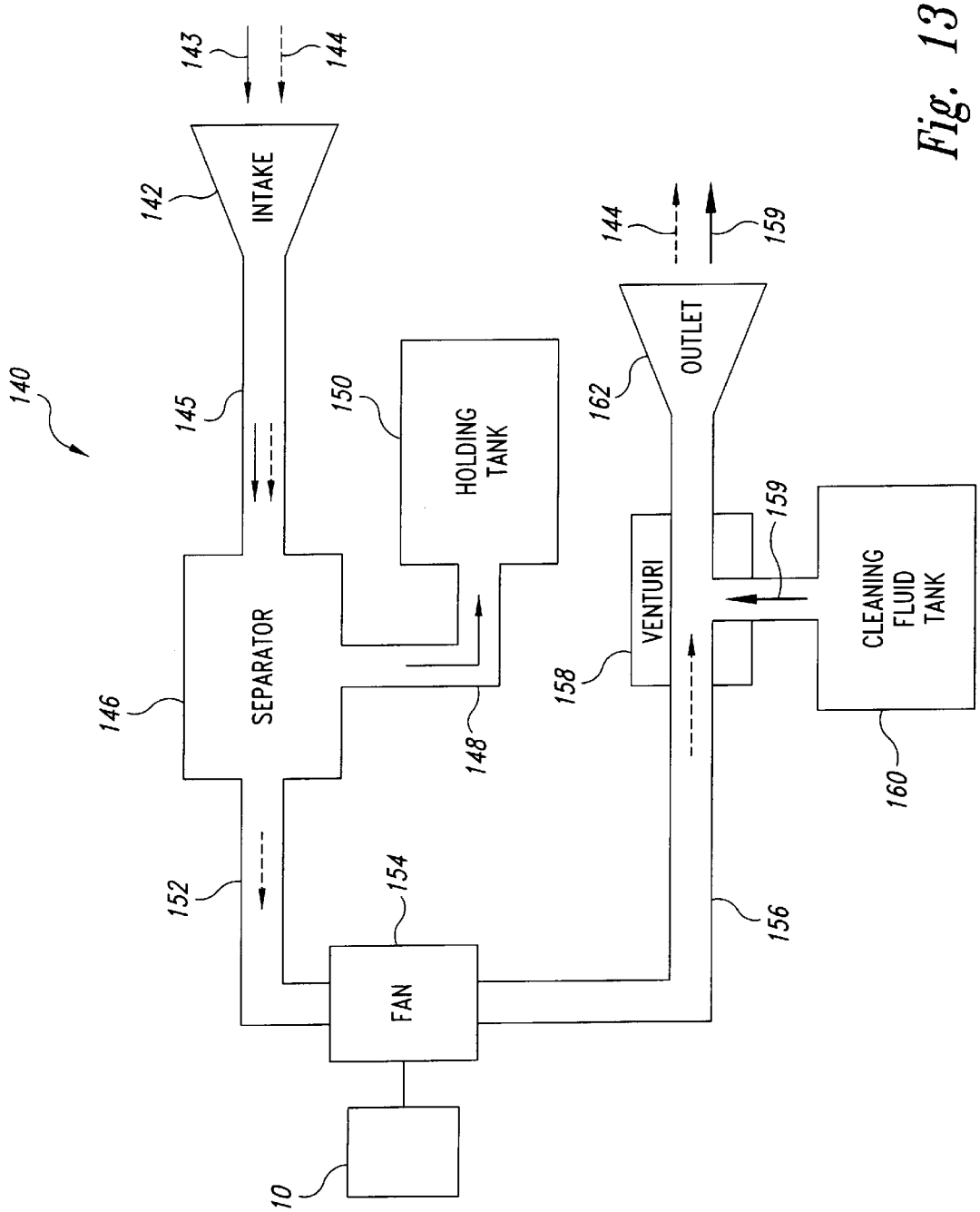
FIG. 13 is a block diagram illustrating the electric motor in accordance with an extractor embodiment of the present invention.

In another embodiment, the motor 10 is incorporated into a floor buffer 130 as shown in FIG. 13. The floor buffer 130 includes the motor 10 contained by a housing 132, a handle 134, and frictional material 136 such as a buffer pad or ring brush that is coupled to the end portion 28b of the motor shaft 28. The motor 10 has armature aspect ratios of 3 or greater and stator aspect ratios of 5 or greater. For typical sized floor buffers, the armature diameter, $D_A$, is approximately 5 inches due to the large torque requirements. Prior art floor buffers have gear reduction systems to convert higher rotational speeds of their motors to the lower rotational speeds of the frictional material 136 and to supply sufficient torque as required. For the present invention, the motor 10 has sufficient torque and low rotational speed so that no gear reduction system is required.

In another embodiment, the motor 10 is incorporated in a carpet or floor cleaning extractor 140. Fundamentals of operation of the extractor 140 as related to the motor 10 are depicted by the block diagram of FIG. 14. The extractor 140 includes an intake 142 into which dirty fluid 143 and air 144 are forced by suction. The dirty fluid 143 and air 144 move through a fluid/air passage 145 to a separator 146 where the dirty fluid is separated from the air.

Upon separation, the dirty fluid 143 flows through a fluid passage 148 to a holding tank 150 and the air 144 flows through air passage 152 to a fan 154. The fan 154 is coupled to the motor 10 which provides motive force to the fan. The air 144 is expelled from a second air passage 156 to a venturi 158 where the expulsion of the air 144 causes cleaning fluid 159 to be drawn from a cleaning fluid tank 160. The air 144 and cleaning fluid 159 are then expelled through an outlet 162 onto a floor or carpet (not shown).

Under operation, the motor 10 is used along with the fan 154 to provide air flow to dispense the cleaning fluid 159 via venturi effect onto carpets and floors and to provide suction to extract the dirty fluid 143 from carpets and floors. The motor 10 used with the extractor 140 has an armature aspect ratio of 3 or greater and a stator aspect ratio of 5 or greater and has an armature diameter, $D_A$, similar to that used with the motor in the vacuum cleaner 84 described above. Due to lower rotational rates and higher torque output of the motor 10, the extractor 140 operates with less noise than prior art extractors.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A universal electric motor comprising:

a motor shaft;

a commutator attached to the motor shaft;

an armature having an armature diameter, an armature thickness, an armature aspect ratio, and armature windings, the armature aspect ratio equal to the armature diameter divided by the armature thickness, the armature windings being electrically coupled to the commutator, the armature aspect ratio being no less than three, a portion of the armature having a magnetic permeability such that when the armature portion is saturated by a magnetic field, the armature portion is saturated at or above 1.8 Tesla, the armature being attached to the motor shaft; and a stator having a stator outer diameter, a stator thickness, a stator aspect ratio, and stator windings, the stator aspect ratio equal to the stator outer diameter divided by the stator thickness, the stator aspect ratio being no less than five, a portion of the stator having a magnetic permeability such that when the stator portion is saturated by a magnetic field, the stator portion is saturated at or above 1.8 Tesla.

2. The universal electric motor of claim 1 wherein the armature aspect ratio is no less than five.

3. The universal electric motor of claim 1 wherein the portion of the armature has a magnetic permeability such that when the armature portion is saturated by a magnetic field, the armature portion is saturated at or above 1.85 Tesla.

4. The universal electric motor of claim 1 wherein the armature diameter is no more than six inches.

5. The universal electric motor of claim 1 wherein the motor shaft has a key and the armature further comprises plates having keyways aligned with the key on the motor shaft.

\* \* \* \* \*